Feb. 19, 1946.  A. G. DEAN  2,395,172
AIRCRAFT PICK-UP AND TOWING APPARATUS
Filed Oct. 25, 1943  2 Sheets-Sheet 1
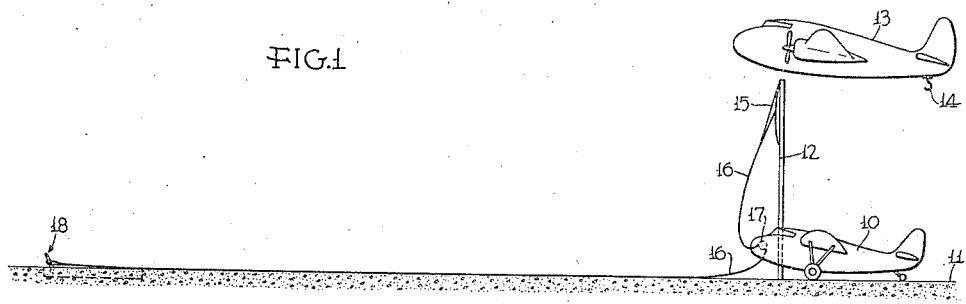
FIG.1
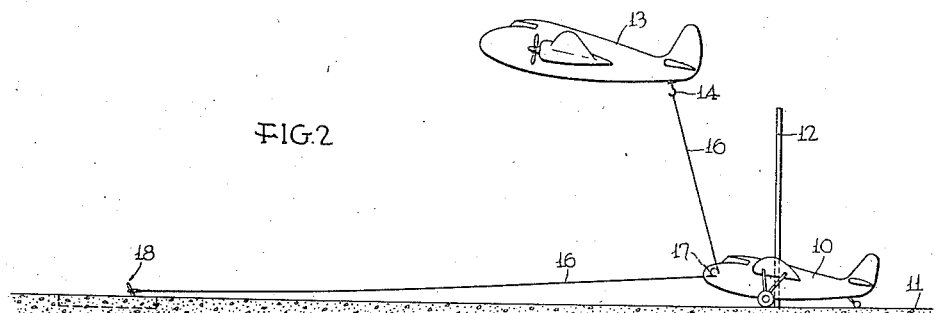
FIG.2
FIG.3
FIG.4
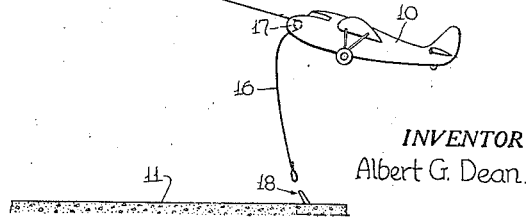
INVENTOR
Albert G. Dean.
BY *John P. Tarbox*
ATTORNEY

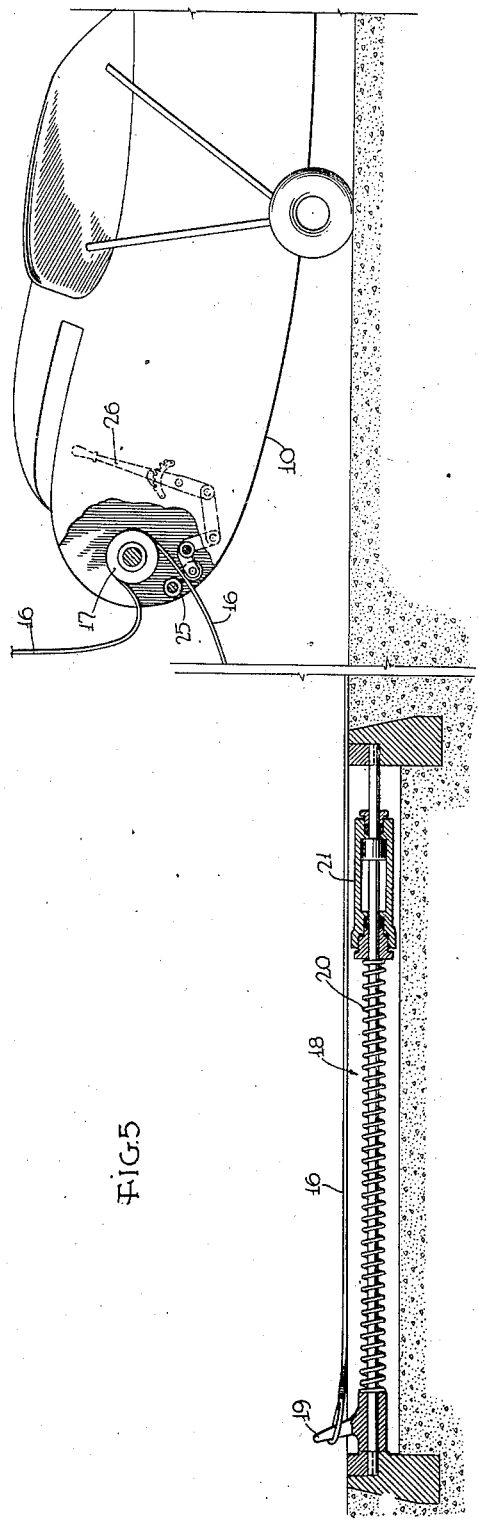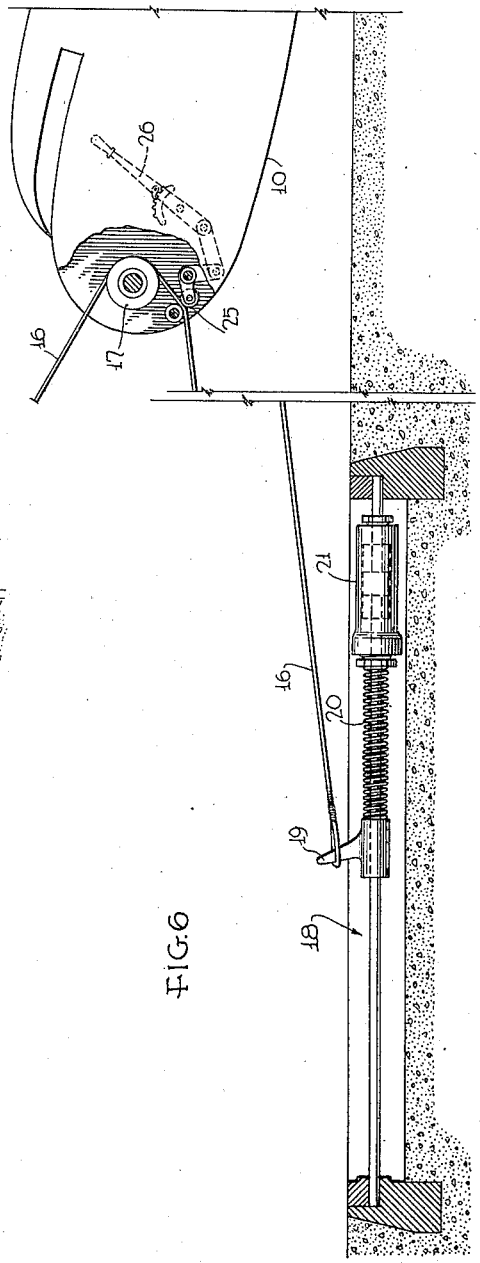
INVENTOR
Albert G. Dean.
BY John P. Tarbox
ATTORNEY

Patented Feb. 19, 1946

2,395,172

UNITED STATES PATENT OFFICE 2,395,172

AIRCRAFT PICKUP AND TOWING APPARATUS

Albert G. Dean, Narberth, Pa., assignor to Edward G. Budd Manufacturing Company, Philadelphia, Pa., a corporation of Pennsylvania Application October 25, 1943, Serial No. 507,508

8 Claims. (Cl. 244—3)

This invention relates to aircraft pick-up and towing apparatus and method and has for an object the provision of improvements in this art.

The invention will be discussed in connection with the pick-up and towing of a glider by a powered airplane in flight; but it will be understood that the invention may have other uses.

One of the objects of the invention is to provide for the pick-up of a glider from a position of rest by a powered airplane in flight without undue shock to either airplane or glider or the towing cable and without undue loss of speed of the airplane.

Another object is to provide effective pick-up apparatus without adding undue weight to either the towing or towed craft.

Another object is to place the shock-absorbing mechanism on the ground where it may be as heavy and effective as desired without adding to the weight of either the towing or towed airplane.

The above and other objects and advantages of the invention will be evident from the following description of an illustrative embodiment of the invention, reference being made to the accompanying drawings, wherein:

Fig. 1 is a schematic elevation of the apparatus immediately before pick-up;

Fig. 2 is a similar view shortly after pick-up;

Fig. 3 is a similar view at an intermediate stage;

Fig. 4 is a similar view at the time the glider breaks its ground connections;

Fig. 5 is an enlarged view of the towed plane and associated ground equipment; and Fig. 6 is a further enlarged front elevation of traction mechanism on the towed plane.

A glider 10 is shown in Fig. 1 in a position of rest on a runway 11 adjacent cable loop pick-up towers 12 convenient to a powered airplane 13 in flight. The hook 14 of the powered airplane moves in a position to engage the loop 15 of a towing cable 16 which passes over a pulley 17 in the nose of the glider and extends thence forward along the runway to shock-absorbing mechanism 18 in the runway.

The cable 16 is attached to an open-front hook 19 of the shock-absorbing mechanism 18 so as to be released as the glider passes thereover; and the shock-absorbing mechanism itself may comprise a long coil spring 20 and any suitable damping or check means 21.

The hook 14 of the powered airplane may be attached to a cable carried on a reel or other suitable mechanism (not shown) for paying off or taking up the cable.

The pulley 17 in the glider is mounted on a shaft so as to be freely rotatable when desired, but is provided with a brake for applying any desired resistance to the passage of the cable. The pulley may have a V-shaped groove in which the cable wedges to avoid free slippage of the cable past the pulley when the brake is applied. There may also be enclosing and pressing means for the cable on or adjacent the pulley, such for example as the clamping device 25 operated by the hand lever 26. Any other suitable arrangement for resisting the movement of the cable past the pulley may be used if desired. The pilot of the glider will have control of this action. This mechanism also provides release from the towing cable at the desired time.

The action of the apparatus is as follows: With the parts arranged as in Fig. 1, the power airplane 13 flies forward at the proper location and its hook 14 engages the lop 15 of the towing cable 16. It takes the loop from the towers 12 and pulls the cable taut over the pulley 17 in the glider, the pulley at this time being released for free rotation. The first shock of setting the glider into motion is taken in the shock-absorbing mechanism 18. The powered airplane and the glider may also be provided with shock-absorbing mechanism, but the major shock is taken by the ground mechanism. When the movement of the shock-absorbing mechanism has been taken up, as in Fig. 2, the glider has been accelerated to approximately half the speed of the powered airplane due to the cable and pulley arrangement. Of course, the pay-out mechanism in the powered airplane may have altered this situation and may continue to alter it, but the present interest is largely in the apparatus herein illustrated.

After the first shock and acceleration of starting have passed, the glider pilot begins to brake the passage of the cable and increase the glider speed. This continues until when the glider reaches the shock-absorbing mechanism and pulls the bottom cable loop off the hook 19, the glider will have the same speed as the powered towing airplane.

The part of the tow cable below the glider pulley which is left extended when the glider becomes directly connected with the towing airplane is later taken up by easing up on the brake or clamp. The clamp 25 forms a secure anchorage for the cable while the glider is being towed. However, it is such as to permit intentional release of the cable when the glider is to be separated from the towing craft.

The apparatus provides for a gradual acceleration of the towed craft by the towing craft from a zero speed to full speed without harmful or objectionable shock; and also provides that the heavy shock-absorbing mechanism may be mounted on the ground without adding weight to either the towing or towed craft.

While one embodiment has been described to illustrate the principles of the invention, it is to be understood that there may be various embodiments within the limits of the prior art and the scope of the subjoined claims.

What is claimed is:

1. Pick-up and towing apparatus comprising in combination with a towing craft in flight and provided with a pick-up hook and a towed craft at rest, a towing cable having an end loop supported in the path of the hook carried by the towing craft, shock-absorbing mechanism secured at a fixed position as on the ground to which the other end of the cable is attached, said cable having an end loop detachably secured to said shock-absorbing mechanism, a pulley on said towed craft over which a bight of said cable passes, and means for snubbing and finally halting the movement of the cable in its passage over said pulley.

2. Pick-up and towing apparatus comprising in combination with a towing craft and a towed craft headed in the same direction, a towing cable which is caught by the towing craft at one end and thereafter held by the towing craft to tow the towed craft, the cable being held releasably at its other end by a relatively fixed anchorage ahead of the towed craft, the intermediate portion of the cable passing in a bight around a guide device on the towed craft to give initially to the towed craft a smaller speed and distance travel than that of the towing craft, and finally a speed equal to that of the towing craft, and means on the towed craft to hold the cable for direct connection to the towing craft after the towed craft has attained the same speed as the towing craft.

3. Pick-up and towing apparatus comprising in combination with a towing craft and a towed craft headed in the same direction, a towing cable attached at one end to and retained by the towing craft, at the other end the cable being releasably attached to a relatively fixed anchorage ahead of the towed craft, and the cable intermediate its ends passing in a bight about a guide on the towed craft to give initially to the towed craft a smaller speed and distance travel than that of the towing craft and finally a speed equal to that of the towing craft, means on the towed craft to hold the cable for direct connection to the towing craft after the towed craft has attained the same speed as the towing craft, and shock-absorbing means provided for the cable to ease the shock of starting the towed craft into motion.

4. Pick-up and towing apparatus comprising in combination with a towing craft and a towed craft headed in the same direction, a towing cable attached at one end to and retained by the towing craft, at the other end the cable being releasably attached to a relatively fixed anchorage ahead of the towed craft, and the cable intermediate its ends passing in a bight about a guide on the towed craft to give initially to the towed craft a smaller speed and distance travel than that of the towing craft and finally a speed equal to that of the towing craft, means on the towed craft to hold the cable for direct connection to the towing craft after the towed craft has attained the same speed as the towing craft, and shock-absorbing means provided for the cable to ease the shock of starting the towed craft into motion, said shock-absorbing means being provided on the relatively fixed anchorage.

5. Pick-up and towing apparatus comprising in combination with a towing craft and a towed craft headed in the same direction, a towing cable attached at one end to and retained by the towing craft, at the other end the cable being releasably attached to a relatively fixed anchorage ahead of the towed craft, and the cable intermediate its ends passing in a bight about a guide on the towed craft to give initially to the towed craft a smaller speed and distance travel than that of the towing craft and finally a speed equal to that of the towing craft, means on the towed craft to hold the cable for direct connection to the towing craft after the towed craft has attained the same speed as the towing craft, shock-absorbing means provided for the cable to ease the shock of starting the towed craft into motion, and means for altering the travel of the cable over the guide device on the towed craft to increase the speed of the towed craft relative to the towing craft, and finally to bring it up to the same speed as the towing craft for continued travel thereafter.

6. Pick-up and towing apparatus for a towing craft and a towed craft headed in the same direction of travel, a towing cable secured at one end to the towing craft, secured at the other end to a relatively fixed anchorage in front of the towed craft when it is in initial position, and the cable passing rearwardly in a loop from the towing craft and the anchorage to the towed craft, a device on the towed craft over which the loop of the cable passes, and means on the towed craft for snubbing and finally stopping the passage of the cable past said device, whereby, the towed craft is initially moved at a speed about half that of the towing craft and thereafter is moved at a relatively increasing speed until it finally attains a speed equal to that of the towing craft and thereafter continues to move with the towing craft and at the same speed thereof.

7. The method of picking up a towed craft by a towing craft having forward movement relative thereto and in the same direction by a cable having a suspended pick-up loop at one end, a bend over a member on the towed craft, and a loop at the other end releasably connected to a relatively fixed shock-absorbing mechanism at a distance in front of said towed craft when in initial position, which method comprises, engaging the suspended loop of the first said end of the cable by the moving towing craft and through said shock-absorbing mechanism setting said towed craft into movement at approximately half the speed of the towing craft, then gradually snubbing said cable on said towed craft until when the towed craft passes said shock-absorbing mechanism and picks up the releasable second end of the cable it is traveling at approximately the full speed of the towing craft, and thereafter halting the passage of the cable relative to the towed craft so that the towed craft travels at the full speed of the towing craft.

8. The method of picking up a towed craft by a towing craft headed in the same direction by the use of a cable having a bight passing over a brake-equipped guide on the towed craft, one end of the cable being suspended in position to be caught by the towing craft and the other end of the cable being releasably secured to a relatively fixed anchorage in front of the towed craft when in initial position, and the cable being associated with shock-absorbing means, which method comprises, engaging the first end of the cable with the moving towing craft while leaving the pulley in the towed craft free for movement whereby to start the towed craft into movement at a reduced speed relative to the speed of the towing craft, then gradually increasing the resistance to movement of the cable in the guide on the towed craft until all movement is halted, whereby to cause the towed craft to travel at the same speed as the towing craft before the second end of the cable is released from the fixed anchorage.

ALBERT G. DEAN.